US011790047B2

(12) United States Patent
Johnson et al.

(10) Patent No.: US 11,790,047 B2
(45) Date of Patent: Oct. 17, 2023

(54) DIVERSITY SAMPLING FOR TECHNOLOGY-ASSISTED DOCUMENT REVIEW

(71) Applicant: Legility Data Solutions, LLC, Nashville, TN (US)

(72) Inventors: Jeffrey A. Johnson, Frisco, TX (US); Md Ahsan Habib, McKinney, TX (US); Chandler L. Burgess, Dallas, TX (US)

(73) Assignee: Consilio, LLC, Washington, DC (US)

( * ) Notice: Subject to any disclaimer, the term of this patent is extended or adjusted under 35 U.S.C. 154(b) by 179 days.

(21) Appl. No.: 17/004,953

(22) Filed: Aug. 27, 2020

(65) Prior Publication Data

US 2022/0067456 A1 Mar. 3, 2022

(51) Int. Cl.

| | |
|---|---|
| ***G06N 20/10*** | (2019.01) |
| ***G06F 18/2415*** | (2023.01) |
| ***G06F 16/93*** | (2019.01) |
| ***G06F 18/214*** | (2023.01) |

(52) U.S. Cl.

CPC .......... *G06F 18/2415* (2023.01); *G06F 16/93* (2019.01); *G06F 18/2155* (2023.01); *G06N 20/10* (2019.01)

(58) Field of Classification Search

CPC .... G06K 9/6277; G06K 9/6259; G06F 16/93; G06N 20/10

USPC .......................................................... 707/736

See application file for complete search history.

(56) References Cited

U.S. PATENT DOCUMENTS

| | | | | |
|---|---|---|---|---|
| 9,607,272 | B1 * | 3/2017 | Yu | G06N 20/00 |
| 10,354,203 | B1 * | 7/2019 | Carr | G06N 20/20 |
| 2002/0174113 | A1 * | 11/2002 | Kanie | G06F 16/3334 |
| 2015/0012448 | A1 * | 1/2015 | Bleiweiss | G06Q 50/18 705/311 |
| 2015/0310068 | A1 * | 10/2015 | Pickens | G06Q 10/10 707/694 |
| 2016/0048587 | A1 * | 2/2016 | Scholtes | G06N 7/005 706/11 |
| 2016/0275147 | A1 * | 9/2016 | Morimoto | G06F 16/93 |
| 2016/0371261 | A1 * | 12/2016 | Cormack | G06N 20/00 |
| 2017/0116544 | A1 * | 4/2017 | Johnson | G06N 7/005 |

* cited by examiner

*Primary Examiner* — Hicham Skhoun
(74) *Attorney, Agent, or Firm* — Johnson, Marcou, Isaacs & Nix, LLC

(57) ABSTRACT

The technology implements diversity sampling for a technology-assisted review of documents. An apparatus obtains an unlabeled set of documents and constructs a first batch of documents. The apparatus obtains labels for the documents and constructs a classification model using the labeled documents. The apparatus logs a found rate of a subsequent batch of documents from the unlabeled set of documents, the subsequent batch of documents being selected based on a comparison to the classification model. The apparatus determines that the classification model requires further training based on the found rate of the subsequent batch of documents and constructs a second batch of documents that includes an amount of diversity, which may be based on the found rate. The apparatus obtains labels for the second batch of documents and updates the model using the labeled second batch of documents. The method may be repeated to continue to refine the classification model.

20 Claims, 4 Drawing Sheets

DIVERSITY SAMPLING FOR TECHNOLOGY-ASSISTED DOCUMENT REVIEW

TECHNICAL FIELD

The present disclosure relates to electronic document review and, more particularly, to inserting diverse documents into a document set during technology-assisted document review.

BACKGROUND

In recent years, technology-assisted review ("TAR") has become an increasingly important component of the document review process, particularly in litigation discovery. This change is fueled largely by the dramatic growth in data volumes that may be associated with many matters and investigations, which require review for relevancy to a litigation matter.

Potential populations for document review frequently exceed several hundred thousand documents, and document counts in the millions are not uncommon. The sheer size of electronically stored documents and the cost, in money and time, of their review in connection with litigation and regulatory proceedings drives the need for TAR and the development of predictive coding software.

In certain traditional linear review, an attorney that is an expert in the subject matter trains a group of contract attorneys or junior associates to churn through the documents for the weeks or months that it may take to complete the review of each document. This process is lengthy and inefficient because a significant portion (generally a majority) of the attorneys' time is spent reviewing non-relevant documents. Budgetary and/or time constraints often make a once traditional linear review of these data populations impractical, if not impossible, which has led to an increased importance in "predictive coding" as a TAR approach. The objective of predictive coding is to design a machine-learning based system that labels documents as relevant or non-relevant to a specific issue or issues. This predictive coding process still requires expert human review but significantly reduces the time and money required to complete the review process by maximizing the focus on relevant documents.

A key challenge in any predictive coding approach is striking the appropriate balance in training the system to identify relevant and non-relevant documents. Conventional systems are unable to minimize the time that subject matter expert(s) spend in training the system, while also ensuring that the subject matter expert(s) perform enough training to achieve acceptable classification performance over the entire review population. Conventional systems have not led to a principled approach for stabilizing the active learning process at a balance between these factors.

SUMMARY

The technology described herein includes computer implemented methods, computer program products, and systems/apparatus to implement diversity sampling for technology-assisted review ("TAR") of documents. In diversity sampling, diverse documents from a batch of documents are inserted into a review of a set of documents that are likely to be relevant to determine whether any of the diverse documents are also relevant to a topic. In TAR, the system identifies a set of documents as potentially relevant to a topic and presents these documents for review. In diversity sampling, the system identifies one or more diverse documents that were not identified as being potentially relevant and inserts the diverse documents into the stream of documents being reviewed. When diverse documents are determined by a reviewer to be relevant to the topic, then the system will identify characteristics of the diverse set of documents as relevant to the topic.

In certain examples, a system obtains an unlabeled set of documents and constructs a first batch of documents. An unlabeled document is a document that the system has not yet determined whether it is relevant to a particular topic. The system presents the unlabeled documents to a reviewer to obtain in indication whether each presented document is relevant or not relevant to the topic, and labels each reviewed document accordingly. After a sufficient number of documents are labeled as relevant and not relevant, the system constructs a classification model using the now labeled first batch of documents. The classification model can identify unreviewed documents that may be relevant or not relevant to the topic based on characteristics shared between labeled and unlabeled documents. The system then uses the constructed classification model to identify other unlabeled documents that are potentially relevant to the topic and presents a newly identified batch of unlabeled documents to the reviewer. The system logs a rate of relevant documents being found in this newly identified batch of unlabeled documents. The system determines that more diversity is required in the documents to improve the model based on the found rate of the documents in the identified batch, or any other suitable indication that additional training is required, and constructs a second batch of documents. The system identifies one or more diverse documents from an unlabeled set of documents, using a diversity measure, and inserts the diverse documents into the second batch of documents being reviewed. When diverse documents are determined to be relevant or not to the topic upon review, then the system identifies characteristics of the diverse documents and includes those characteristics in an updated classification model.

In certain other example aspects described herein, systems, computer-implemented methods, and computer program products to implement diversity sampling for TAR of documents are provided.

These and other aspects, objects, features, and advantages of the technology will become apparent to those having ordinary skill in the art upon consideration of the following detailed description of illustrated example embodiments.

DETAILED DESCRIPTION

Overview

Figure 1:
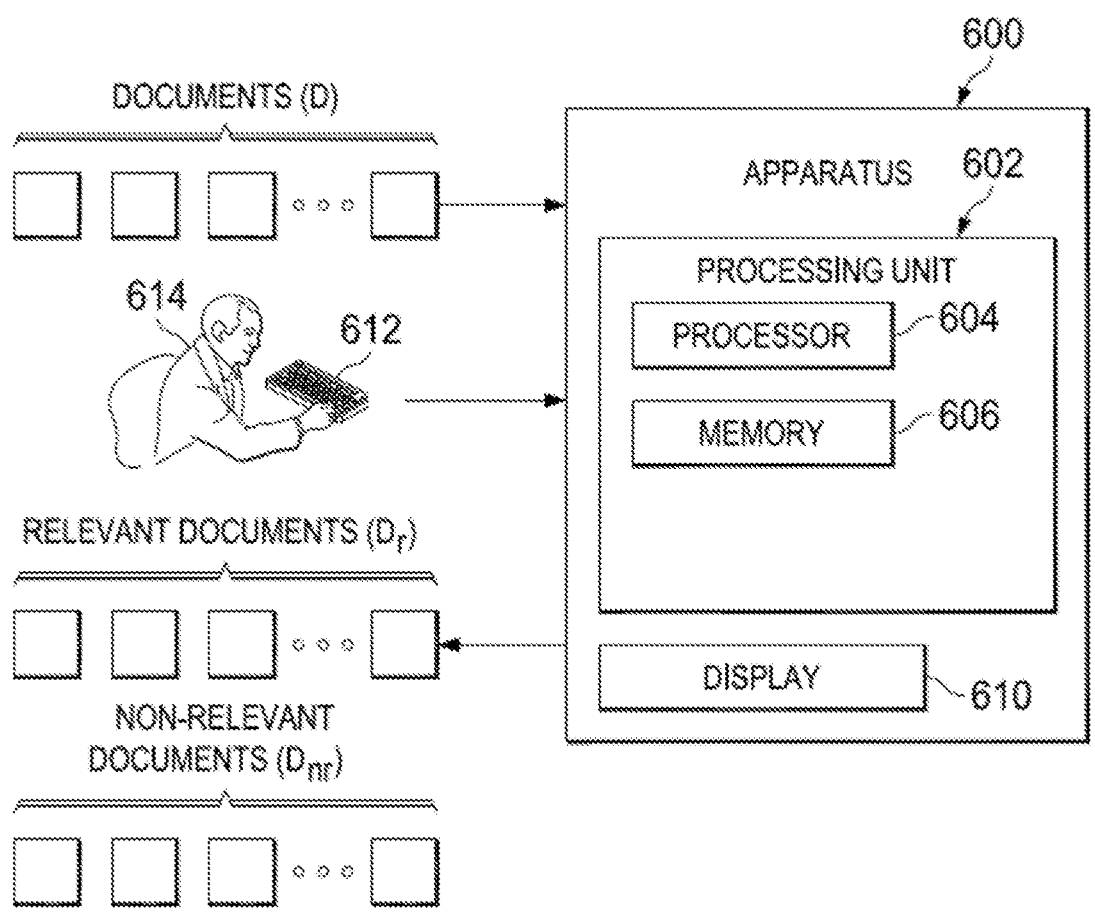
FIG. 1 is a block diagram depicting a portion of a simplified communications and processing architecture of a system to implement diversity sampling for technology-assisted review ("TAR") of documents, in accordance with certain examples of the technology disclosed herein.

The technologies described herein provide systems/apparatus, computer-implemented methods, and computer program products to insert diverse documents into a document set during technology-assisted review ("TAR") of documents.

TAR of documents uses predictive coding to improve efficiency in reviewing a large set of documents. The document review task is similar to a supervised classification task in machine learning where, given a large collection of documents, the primary objective of predictive coding is to use a sub-collection of human-labeled documents to build a classification model. The classification model discriminates the remaining documents in the collection as relevant (also known as "responsive" in the legal domain) or non-relevant (also known as "non-responsive" in the legal domain). Document review applies to many different fields. For example, the documents may be associated with a document review in a legal proceeding, a scientific field, an academic field, or any other suitable field, and may apply the technology described herein.

One objective of predictive coding is to maximize the discovered relevant documents while minimizing the human labeling efforts as measured by the number of documents that are labeled by the attorneys. A principled machine learning approach for fulfilling this objective is known as active learning, in which the classification model is updated through an iterative process where the prevailing learning model of an iteration is utilized for selecting an unlabeled training document to query the document's label, and then the selected document becomes part of the training set of the subsequent iterations. A more practical variant of active learning is known as batch-mode active learning, which extends the training set by adding a fixed-size batch of training documents instead of only one document in each iteration. To achieve a given performance, an active learning approach requires a much smaller number of training documents in comparison to non-active variants, resulting in reduced labeling effort. This characteristic is the reason batch-mode active learning is becoming the most popular learning paradigm for the document review task in the litigation discovery domain.

A challenge in predictive coding is selecting a learning technique that works well for highly imbalanced distributions of responsive and non-responsive documents in a document collection. The selection is important because in real-world document review populations, the number of responsive documents may be a very small percentage (for example, between 1% and 10%) of the total documents in the collection, although some document sets include higher numbers of responsive documents. A support vector machine ("SVM") hyperplane is a robust classification learning technique that works well for highly imbalanced legal datasets. It is also a useful learning technique for large-scale text categorization. Additionally, SVM provides easily computable metrics that can be used to choose a new batch of training instances in a batch-mode active learning setup.

Various methods for active learning using SVM, or other suitable classification model, may be used to select the documents, or batches of documents, to use for training. For example, the technology can further include implementing a Diversity Sampler process or a Biased Probabilistic Sampler process to select the new batch of unlabeled instances. The SVM creates a hyperplane based on the process used. Other models may be created by other types of batch-mode active learning processes, algorithms, systems, or devices. This specification describes an example wherein an SVM is used for batch-mode active learning and hyperplanes are the type of classification model created. However, the technology is not limited to this example.

The technology determines when the selected batches of documents should include additional diverse samples and the number of diverse samples to include in the batch. After the classification model is created, subsequent documents for review are provided to the reviewers based on a comparison of each document to the classification model. The subsequent documents may be provided as batches or continuously.

A computing device that is executing the active learning process monitors the found rate of the documents provided for review. A document is determined to be found when a reviewer of a document submitted for review identifies the document as being relevant. The number of documents found divided by the number of documents being reviewed equals the found rate. That is, the percentage of documents submitted that are determined to be relevant is the found rate.

The computing device logs the found rate either periodically or continuously. For example, the computing device logs the found rate for a period of time, per batch of documents, or by continuously logging after every document result. The found rate may be an instantaneous rate based on a configured number of documents or based on a moving average of found rates, such as a moving average of every three batches or every 100 documents. The computing device analyzes the found rate to determine when the found rate drops below a certain configured amount. For example, if the found rate drops below 10%, then the computing device determines that the found rate is below the configured amount and a response is triggered. In another example, the computing device determines that the found rate is changing at a rate faster than a configured amount rate of change. The computing device determines that the quick decline in found rate is higher than a configured amount. In another example, the computing device determines that the found rate has experienced a magnitude of decline that is greater than a configured amount. That is, the computing device does not have a minimum configured amount for a found rate, but instead identifies a drop in found rate that is greater than a configured amount. In another example, the computing device determines that the found rate is not increasing as expected or at all. The found rate may be determined to have been flat for a period of time greater than a configured amount. Any other suitable found rate measurement may trigger the computing device to take an appropriate action.

When the computing device determines that the found rate has experienced a triggering change, the computing device introduces diversity into a subsequent batch of documents. This diversity of the documents in the subsequent batch of documents may be based on any suitable method or process to introduce documents that are not the highest scoring documents based on the existing model or hyperplane.

Further, the magnitude of the drop in found rate percentages, either the total found rate change or the rate of change of the found rate, causes the computing device to adjust the percentages of diversity accordingly. That is, if the found rate has experienced a slow decline with the overall magnitude of the decline being minimal, then the computing device increases the number of diverse documents in the subsequent batch by a smaller amount. If the found rate has experienced a steep decline with the overall magnitude of the decline being large, then the computing device increases the number of diverse documents in the subsequent batch by a greater amount. The computing device may select a different diversity selection process or method based on the magnitude of the decline of the found rate.

Example System Architectures

Turning now to the drawings, in which like numerals represent like (but not necessarily identical) elements throughout the figures, example embodiments are described in detail.

FIG. 1 is a block diagram depicting a portion of a simplified communications and processing architecture of a system 100 to implement diversity sampling for technology-assisted review ("TAR") of documents, in accordance with certain examples of the technology disclosed herein.

As depicted in FIG. 1, the system 100 includes an apparatus 600. The apparatus 600 includes a processing unit 602 having a communication module (not shown) capable of transmitting and receiving data over a network to other computing devices. For example, the processing unit 602 can include a server, desktop computer, laptop computer, tablet computer, television with one or more processors embedded therein and/or coupled thereto, smart phone, handheld or wearable computer, personal digital assistant ("PDA"), wearable devices such as smart watches or glasses, or any other wired or wireless, processor-driven device. The processing unit 602 includes a processor 604, a memory 606, and any other suitable components to perform the functions described herein. In the example embodiment depicted in FIG. 1, the processing unit 602 is operated by a user 614. The user 614 is alternatively described herein as an expert 614 or reviewer 614.

The apparatus 600 may include a display 610 that provides a user interface or other data to the user 614. The apparatus 600 may include a keyboard 612 or other suitable device or module to receive input from the user 614 to the apparatus 600.

The apparatus 600 performs the functions of the methods described herein, such as providing documents for review, determining found rates, determining diversity to include in the sampling methods, receiving relevant document data, and hosting and updating the hyperplane model. In examples, the apparatus 600 is a single computing device, such as a computer server. In another example, multiple devices may perform the functions of the apparatus 600, or the functions may be performed in a cloud computing environment. In each case, the apparatus 600 presents documents for review to the user 614 via the display 610. A single apparatus 602 may present documents to multiple users 614 via corresponding multiple displays 610. Multiple apparatus 600 may perform the functions described herein to present documents to one or more users 614 via a corresponding one or more displays 610.

A network (not shown) may be used to allow communication between the apparatus 600 and any other computing device, such as a third-party server, a document reviewer computing device, or a document provider. The network includes a wired or wireless telecommunication means by which network devices can exchange data. For example, each network can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

It will be appreciated that the network connections described are examples and other means of establishing a communications link between computers and devices can be used. Moreover, those having ordinary skill in the art having the benefit of the present disclosure will appreciate that computing devices illustrated in FIG. 1 can have any of several other suitable computer system configurations. For example, the apparatus 600 embodied as a mobile phone or handheld computer may not include all the components described above.

Figure 4:
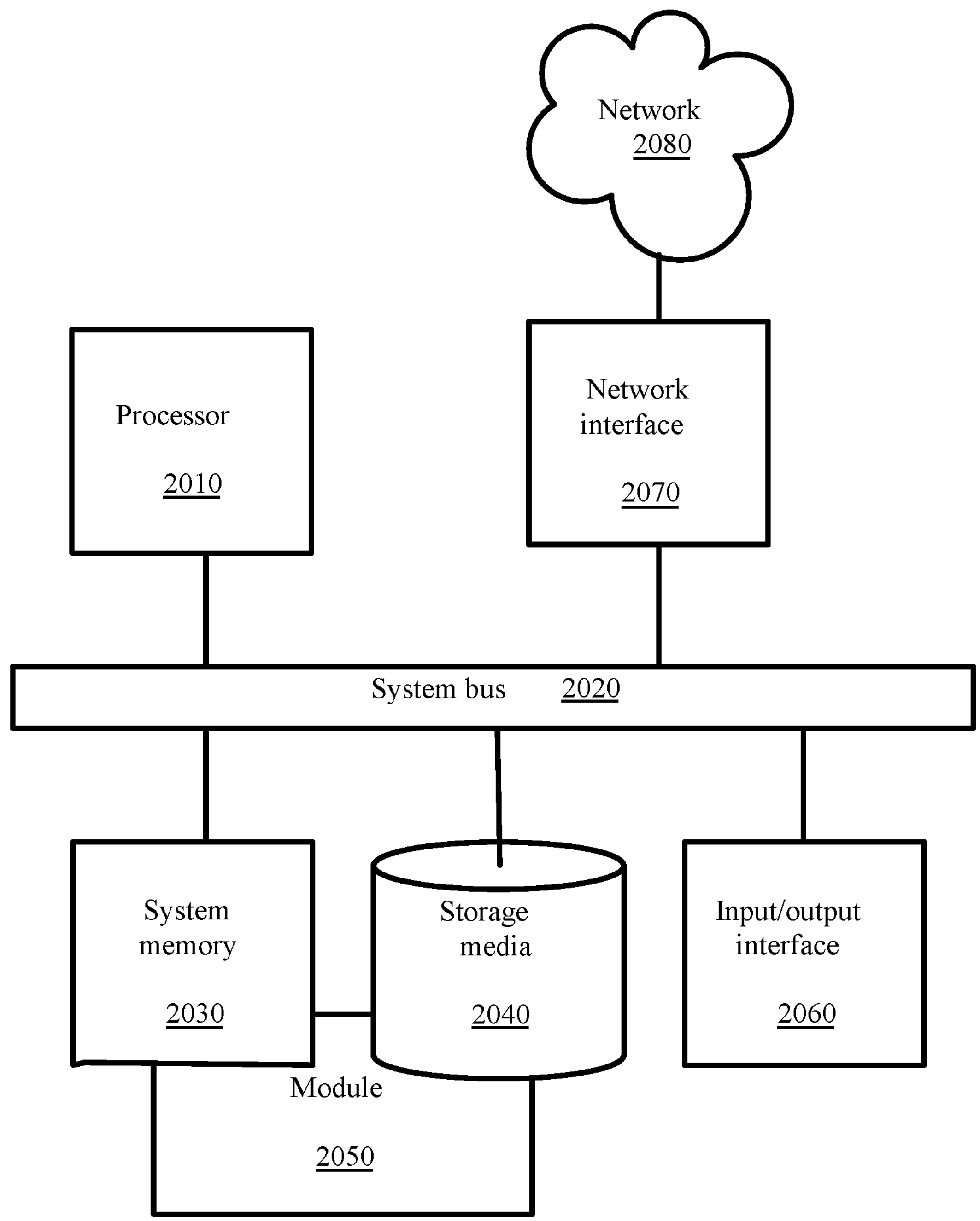
FIG. 4 is a block diagram depicting a computing machine and modules, in accordance with certain examples.

In example embodiments, the network computing devices and any other computing machines associated with the technology presented herein may be any type of computing machine such as, but not limited to, those discussed in more detail with respect to FIG. 4. Furthermore, any modules associated with any of these computing machines, such as modules described herein or any other modules (scripts, web content, software, firmware, or hardware) associated with the technology presented herein may by any of the modules discussed in more detail with respect to FIG. 4. The computing machines discussed herein may communicate with one another, as well as with other computer machines or communication systems, over one or more networks. The network may include any type of data or communications network, including any of the network technology discussed with respect to FIG. 4.

Example Processes

Figure 2:
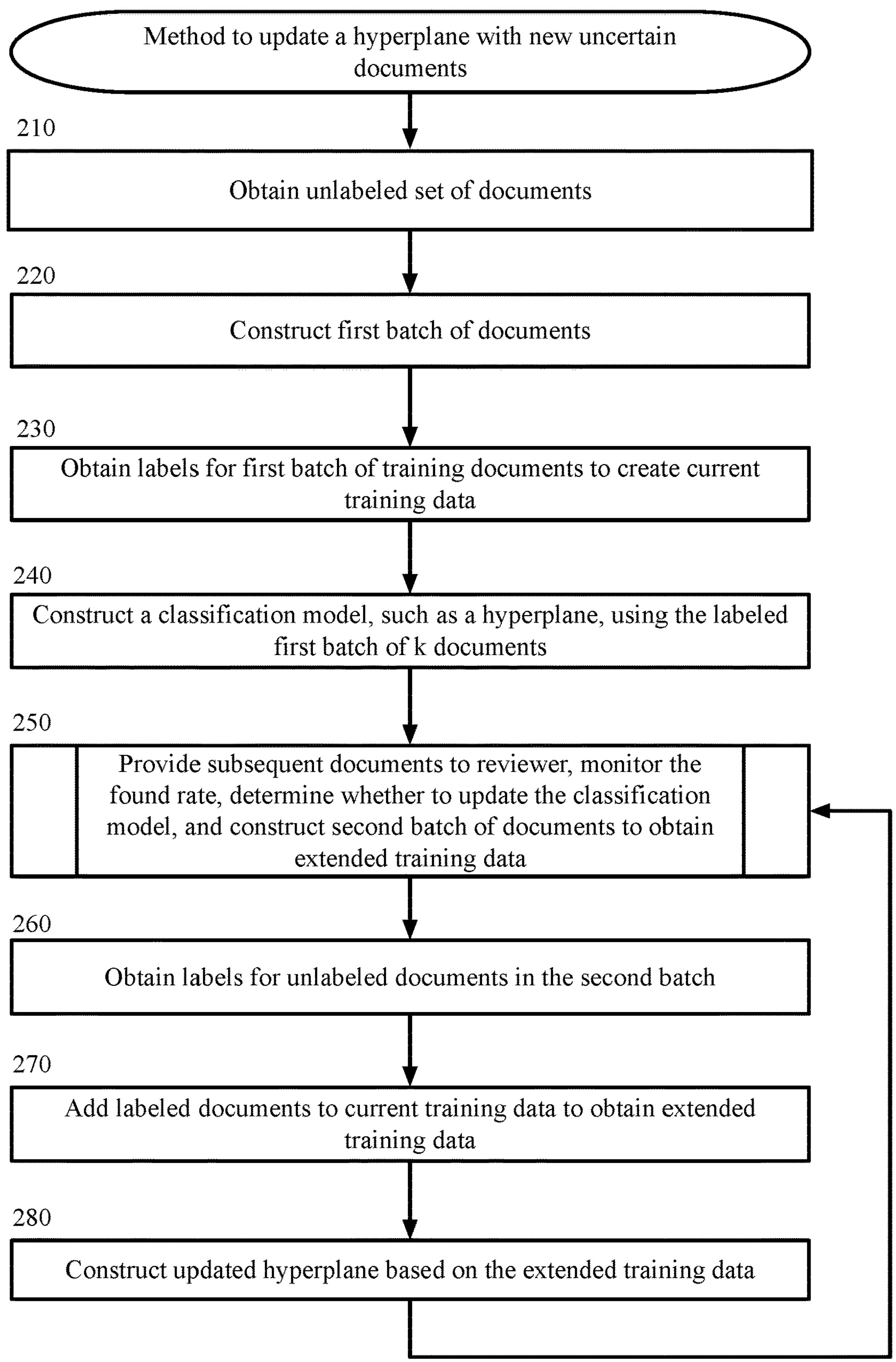
FIG. 2 is a block diagram depicting methods to implement diversity sampling for TAR of documents, in accordance with certain examples of the technology disclosed herein.
Figure 3:
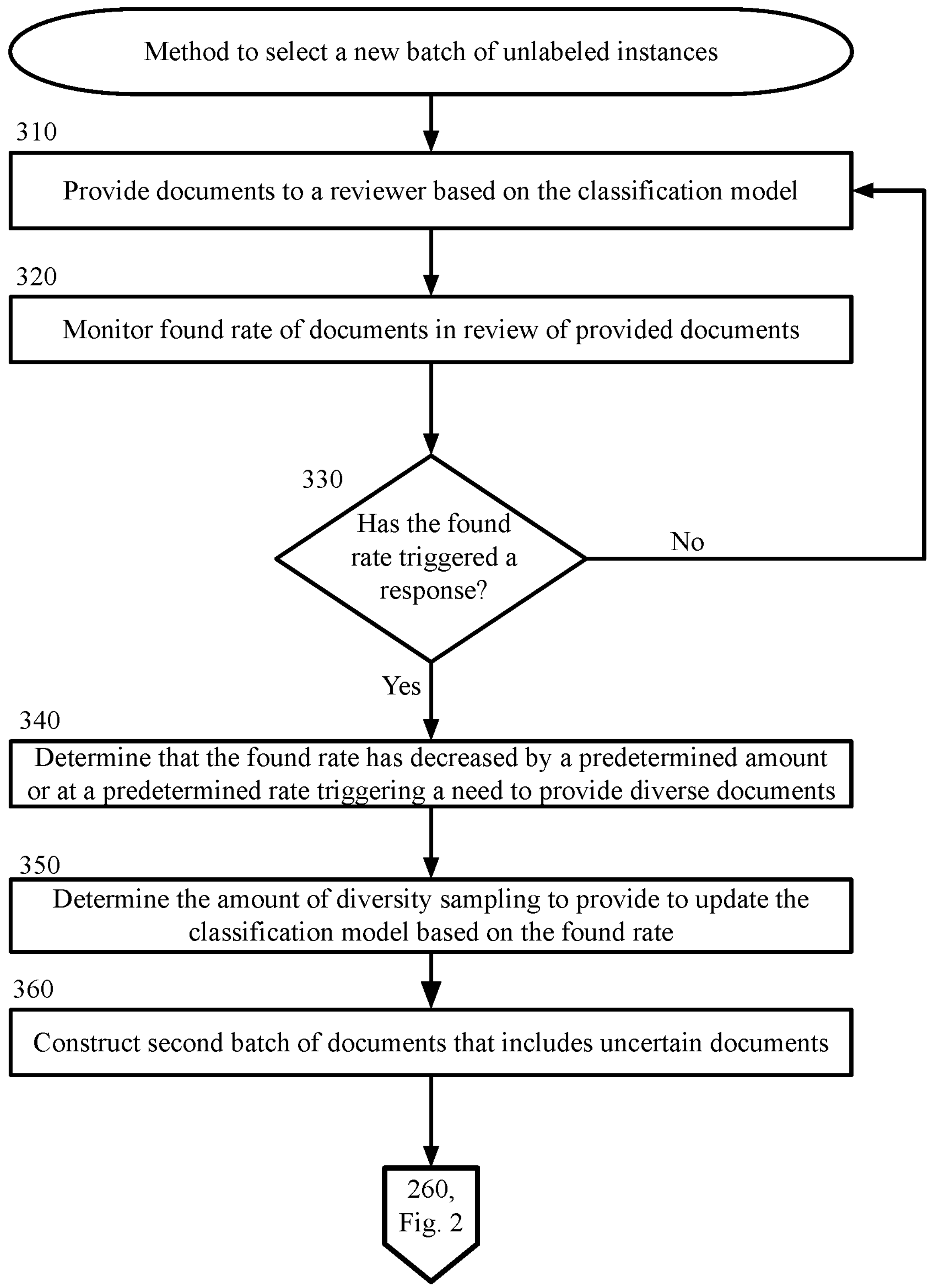
FIG. 3 is a block diagram depicting methods to provide subsequent documents to a reviewer, monitor the found rate, determine whether to update the classification model, and construct a second batch of documents to obtain extended training data, in accordance with certain examples of the technology disclosed herein.

The example methods illustrated in FIGS. 2-3 are described hereinafter with respect to the components of the example architecture in FIG. 1. The example methods also can be performed with other systems and in other architectures including similar elements.

FIG. 2 is a block diagram depicting methods to implement diversity sampling for TAR of documents, in accordance with certain examples of the technology disclosed herein. In the method 200, examples describe a review of a collection of documents, which are potentially related to a legal issue or other suitable topic. The objective of the review task is to discover the responsive, or relevant, documents with the least amount of effort from the expert attorneys. The steps of method 200 use technology-assisted review ("TAR") of documents to minimize the time that subject matter expert(s) 614 spend in training the system, while also ensuring that the subject matter expert(s) 614 perform enough training to achieve acceptable classification performance over the entire review population.

In block 210, the apparatus 600 obtains an unlabeled set of documents. The documents may be provided in any suitable format, such as a digital PDF document. The documents may be a set of documents to be reviewed for relevance to a particular topic. The documents may be provided by any suitable source, such as a party to a legal matter, a corporate party, or an academic institution. In an example, the set of documents are emailed to the apparatus 600 by a party that desires to have documents related to a particular legal topic identified from the set of documents. In another example, the set of documents are uploaded to the apparatus 600 via an internet connection. In another example, the set of documents are provided on a physical memory and the physical memory is connected to the apparatus 600 to upload the set of documents. In another example, the apparatus 600 receives the documents through API requests by the apparatus 600 or by another computing device on behalf of the apparatus 600. The request is communicated to a third-party server or other system that communicates the documents back to the apparatus 600.

In block 220, the apparatus 600 constructs a first batch of documents. The apparatus 600 obtains a batch size, such as size k. For example, the apparatus 600 receives an input of the batch size from the expert 614, from an algorithm, from an industry standard, or from any suitable source. The batch size is selected to provide sufficient documents to allow the classification model to receive an initial training. For batch mode active learning using SVM, given an unlabeled document set, and a batch size k, uniformly sampled k instances from the document set are used to construct the first batch for which attorneys provide the label. The first batch of k documents may be selected randomly from the set of documents. In another example, the first batch of documents are selected by an input from the expert 614 or from any other suitable source. For example, the expert 614 may select a first batch of documents based on the titles of each document including the word "contract." The first batch of documents are communicated to the expert 614 for review via the display 610.

In block 230, the apparatus 600 obtains labels for the first batch of training documents to create current training data. The labeled first batch of k documents are referred to as training data documents. The labels may be provided by the expert 614 that is reviewing the provided documents. Alternative, the labels may be provided by an algorithm, from an industry standard, or by any suitable source. The labels may include any designation for the document, such as relevant, not relevant, unknown, or any other suitable label.

In an example, each document is presented to the expert 614 on a user interface of the display 610. The documents may be presented in a file, on a clickable list, or in any other suitable manner. The label may be applied by the expert 614 by clicking a digital link or other interface object presented on the user interface presenting the documents or otherwise digitally signifying that a document is relevant or not. For example, the expert 614 clicks a virtual button that reads "relevant" or a button that reads "not relevant." The apparatus 600 receives an input of the label for each document and logs the received label for each document.

The apparatus 600 receives a report, list, or other indication of the documents that are relevant. For example, when the expert 614 clicks an interface object that indicates if a document is relevant or not, the apparatus 600 logs the indication and the characteristics of the document that was labeled. Then, the apparatus 600 sorts the documents by the corresponding labels and groups all documents labeled as "relevant" or "not relevant." The characteristics of each document that is labeled relevant and the characteristics of each document that is labeled not relevant are used as current training data for a classification model. Any data that is captured from the documents, such as metadata, key words, formats, or any other data, may be used to train the classification model.

In block 240, the apparatus 600 constructs a classification model, such as a hyperplane, using the labeled first batch of k documents. The classification model uses the labeled documents to build a classification model of a document that is likely to be relevant. New documents that have similar characteristics to the classification model would be determined to be potentially relevant. Characteristics of relevant documents that are used to build the model might include key words or key numbers from the document, the format of the document, a title of the document, or any other suitable characteristics. For example, if a majority of the documents that are labeled as relevant include the key word "contract," then the model may use the inclusion of the word "contract" as one indication that another document that includes the word "contract" is similarly potentially relevant. The indication would be taken in context of other indications derived from other document attributes, key words, or other characteristics.

In block 250, the apparatus 600 provides subsequent documents to a reviewer, monitors the found rate, determines whether to update the classification model, and constructs a second batch of documents to obtain extended training data. Block 250 is described in greater detail with reference to the method 250 of FIG. 3.

FIG. 3 is a block diagram depicting methods 250 to provide subsequent documents to a reviewer, monitor the found rate, determine whether to update the classification model, and construct a second batch of documents to obtain extended training data, in accordance with certain examples of the technology disclosed herein. In certain active learning setups, the initial classification model, such as a hyperplane, represents the current knowledge regarding the decision boundary between two classes—relevant documents and not relevant documents. However, this classification model is obtained by training over the existing training set, and hence, the model can be substantially different than the optimal hyperplane considering the entire dataset. For subsequent batches, many of the existing active learning methods, such as SVM, select a batch of k documents that are nearest to the current classification model. As such systems continue to provide documents that are selected based on a non-optimal model, the methods perform poorly if the initial classification model is distant from the ideal classification model. Specifically, for TAR datasets that have a smaller number of relevant documents, a uniform random selection at initialization most often returns a classification model which is distant from the optimal classification model. Thus, such methods may perform poorly on such datasets. FIG. 3 describes improved methods 250 for selecting subsequent batches of documents and updating the classification model.

In block 310, the apparatus 600 provides documents to a reviewer 614, such as the expert 614 or other user 614, based on the classification model. The documents selected for review are provided to the expert 614 via any suitable technology. In an example, each document is displayed to the expert 614 on the display 610. In other examples, the documents are emailed to the expert 614, displayed on a website, displayed on an application, printed for display, or any in other suitable manner provided to the expert 614. The documents are provided based on a comparison of the documents to the classification model. For example, each new document is analyzed to determine characteristics of the document, such as a search for key words, an identification of a title of the document, or formatting of the document. Documents that are determined, based on a comparison to the classification model, to be more relevant are typically selected. For example, in a SVM that creates a hyperplane, the hyperplane is a line that divides likely relevant documents from likely non-relevant documents. The farther a document is away from the hyperplane in the positive direction, the more likely the document is relevant. The farther a document is away from the hyperplane in the negative direction, the less likely the document is relevant.

Thus, in normal operation the apparatus typically selects documents that are farther away from the hyperplane in the positive direction.

In block 320, the apparatus 600 monitors a found rate of documents in a review of provided documents. A document is determined to be found when a reviewer 614, such as expert 614, of a document submitted for review identifies the document as being relevant, such as by clicking an interface object on the user interface of the display 610. The number of documents determined to be relevant divided by the number of documents being reviewed equals the found rate. That is, the percentage of documents submitted that are determined to be relevant is the found rate. For example, if 100 documents are reviewed and 10 are labeled by the expert 614 as being relevant, then the found rate is 0.10 or 10%.

The apparatus 600 logs the found rate either periodically or continuously. For example, the computing device logs the found rate for a period of time, per batch of documents, or by continuously logging after every document result. The found rate may be an instantaneous rate or based on a moving average of found rates, such as a moving average of every three batches or every 100 documents.

In block 330, the apparatus 600 determines if the found rate has decreased. The apparatus 600 determines whether the found rate has decreased by a predetermined amount or at a predetermined rate. For example, a minimum acceptable found rate may be configured to be 10%, below which a response is triggered. If the instantaneous found rate or a moving average of the found rate drops below 10%, then the apparatus 600 determines that the found rate is below the configured amount of 10%.

In another example, the apparatus 600 determines whether the found rate is decreasing at a rate faster than a configured amount. The apparatus 600 determines whether the quick decline in found rate is higher than a configured amount. For example, if a moving average found rate is varying between 20% and 40% at a regular fluctuation rate, but the apparatus 600 determines that the rate had dropped from 40% to 20% in a single reporting period, then the rate of change may be higher than a configured amount. That is, even if the 20% found rate is above a minimum configured amount, the sudden drop in the found rate will trigger a response.

In another example, the apparatus 600 determines whether the found rate has experienced a decline that is greater than a configured amount. That is, the computing device does not have a minimum configured amount for a found rate, but instead identifies a drop in found rate that is greater than a configured amount. In an example, an absolute minimum found rate is not configured, but the found rate for a project is typically close to 20%. If the found rate drops to 10%, then the apparatus 600 determines that the decline of 10% from the typical or average found rate will trigger a response. In another example, the apparatus 600 determines that the found rate is not increasing as expected or at all. The found rate may be determined to have been flat for a period of time greater than a configured amount. For example, if the found rate is close to 10% for a configured number of documents, such as 100, 1000, or 10,000 documents, then the apparatus 600 determines that the flat results will trigger a response.

Any other suitable found rate measurement may be compared to configured minimums, thresholds, or other suitable requirements to determine if a response is triggered. Additionally, each of the configured minimums, thresholds, or other suitable requirement can be configured by an operator of the apparatus 600, or by an application controlling the method 250, to identify a trigger point for an update of the classification model.

In block 330, if the apparatus 600 determines that the found rate has not triggered a response, then the method 250 follows the NO path back to block 310. The apparatus 600 continues to provide documents to reviewers based on the classification model. The apparatus 600 continues to perform the method of blocks 310-330 until the found rate is determined to have decreased and triggered a response.

If the apparatus 600 determines in block 330 that the found rate has decreased or otherwise triggered a response, then the method 250 follows the YES path to block 340.

In block 340, the apparatus 600 determines that the found rate has decreased by a predetermined amount, at a predetermined rate, remained flat instead of improving, or otherwise triggered a need to provide diverse documents. Any of the suitable triggers discussed previously may have triggered the response. For example, if a moving average of the found rate was determined in block 330 to be below 10%, then the apparatus 600 determines that the found rate is below the configured amount of 10% and a response is triggered.

In another example, if the apparatus 600 determined that the found rate is changing at a rate faster than a configured amount, then a response is triggered to update the classification model. For example, when a moving average found rate has been determined to have dropped from 40% to 20% in a single reporting period, then the rate of change may be higher than a configured amount, and the sudden drop in the found rate will trigger a response.

Any other suitable found rate change or lack of change that exceeds to a configured amount, threshold, or rate triggers the computing device to take an appropriate action, such as including or increasing a number of diverse documents in a subsequent batch of documents.

In block 350, the apparatus 600 determines an amount of diversity sampling to provide to update the classification model based on the found rate. The amount of diversity sampling can be based on a configured amount. Alternatively, the amount of diversity sampling can be based on the found rate. For example, the magnitude of the drop in found rate percentages, either the total found rate change or the rate of change of the found rate, causes the apparatus 600 to adjust the percentages of diversity sampling accordingly.

For example, if the found rate incurred a slow decline with the overall magnitude of the decline being smaller, then the apparatus 600 increases the number of diverse documents in the subsequent batch a smaller number. If the found rate incurred a steep decline with the overall magnitude of the decline being larger, then the apparatus 600 increases the number of diverse documents in the subsequent batch a greater number. In relative terms, fewer diverse documents are used in the first instance compared to the second instance. For example, if the second batch of documents contains 100 documents, the apparatus 600 may include 10, 30, or 50 diverse documents depending on the amount of diversity that is desired. The apparatus 600 includes 10 diverse documents based on the found rate decline being smaller, such as the found rate dropping from 20% to 15%. The apparatus 600 includes 30 diverse documents based on the found rate decline being larger than the first example, such as the found rate dropping from 20% to 10%. The apparatus 600 includes 60 diverse documents based on the found rate decline being larger than the second example, such as the found rate dropping from 20% to 5%. Any other suitable formulas, algorithms, or processes may be used to vary the amount of diversity based on the found rate changes. Introducing a greater number of diverse documents is likely to result in fewer documents being labeled by a reviewer 614 as relevant. However, if the one or more of the diverse documents are labeled as relevant, then the classification model will be provided with a new set of characteristics to include in the classification model.

In another example, the apparatus 600 may select a different diversity selection process or method based on the magnitude of the found rate decline. The apparatus 600 may take any other suitable action to introduce diversity to the batch based on the magnitude of the change in the found rate. The apparatus 600 may use any diversity active learning processes or any other suitable processes, such as those described hereinafter with reference to block 360. The "amount" of diversity included in the batch of documents is based on the analysis of the found rate. Thus, for a desired higher diversity level, the apparatus 600 may include documents that are determined by a comparison to the classification model to likely be less relevant, include more of these likely less relevant documents, or both. For example, the apparatus 600 may select a document that has none of the characteristics of the model when a higher diversity is desired while selecting a document that has one or two characteristics of the model when a lower diversity is desired. The document with none of the characteristics of the model is more unlikely to be labeled by a reviewer 614 as relevant. However, if the document is subsequently labeled as relevant, then the classification model will be provided with a new group of characteristics to include in the classification model.

For example, in a SVM that creates a hyperplane, the hyperplane is a line that divides likely relevant documents from likely non-relevant documents. The farther a document is away from the hyperplane in the positive direction, the more likely the document is relevant. The farther a document is away from the hyperplane in the negative direction, the less likely the document is relevant. Thus, in normal operation the apparatus typically will select documents that are farther away from the hyperplane in the positive direction. When the apparatus 600 is not introducing diversity, the apparatus 600 selects documents that are farther from the hyperplane in the positive direction. When the apparatus 600 is introducing diversity, the apparatus 600 selects a determined number of documents that are not farther from the hyperplane in the positive direction. For example, the apparatus 600 selects documents that are closer to the hyperplane. In certain examples when even greater diversity is desired, the apparatus 600 may select documents that are in the negative direction from the hyperplane.

Any other measure of diversity may be configured to introduce diversity into the batch of documents. A higher number of documents that are near the hyperplane or even documents that are in the negative direction from the hyperplane would create more diversity in the batch of documents.

In block 360, the apparatus 600 constructs a second batch of documents that includes diverse documents. If the apparatus 600 is employing batch mode active learning using SVM, given the unlabeled document set, and a batch size k, the apparatus 600 selects k documents from the document set based on a diversity sampling process. The samples are selected based on a process that introduces diversity into the samples. That is, the second batch of documents will include (1) documents that are likely to be relevant based on the classification model, and (2) diverse documents that are not as likely to be relevant based on the current classification model.

A large number of diversity metrics have been proposed to update classification models. Examples include entropy, smallest-margin, least confidence, committee disagreement, and version space reduction. Different metrics are preferred for different learning techniques. For instance, one example uses conditional random field as the learning method and least confidence as the diversity metric for active learning. Other examples use SVM as the learning technique with version space reduction as the diversity metric. Version space reduction provides a solution for active learning under some optimality criterion. The distance of a document from the SVM hyperplane approximates the version space reduction metric, and hence, the document that is the closest to the hyperplane should be chosen in an active learning iteration. In example methods herein, batch-mode active learning methods use SVM as the learning technique, and distance from the hyperplane as the diversity metric.

Diversity sampling includes a mix of exploration and exploitation, where instances are not only selected by their distance from the classification models, but also by an diversity criterion. Because many documents are substantially similar to each other, enforcing diversity among the instances selected in a batch proves desirable. Both Diversity Sampling ("DS") and Biased Probabilistic Sampling ("BPS") facilitate uncertainty, but they differ in the way they select a document. The instance selection of DS is deterministic, whereas the instance selection of BPS is probabilistic. For the DS method, all of the available documents are first sorted in a non-decreasing order of their distance from the current hyperplane and then all of the documents are filtered (not selected to be in the current batch) that are similar to the last instance selected in the current batch. For BPS, a probability vector is constructed and used to select a document in inverse proportion to its distance from the current hyperplane. Using probabilistic selection, BPS methods are similar to the concept of the randomized weighted majority ("RWM") technique used for no-regret online learning. In other examples, uncertainty sampling methods are used.

Regardless of the method used to introduce the diversity, the apparatus 600 includes documents in the second batch of documents that are not considered as likely to be relevant based on the current classification model. For example, instead of selecting 100 documents that are all determined by the classification model likely to be relevant, the apparatus 600 includes 80 documents that are likely to be relevant and 20 documents that are unlikely to be relevant based on the current classification model. The 20 documents have characteristics that are different from the classification model.

While each of these documents may be irrelevant, at least one or more may include a characteristic that is relevant for a different reason than the identified by the current classification model. In an example, the current classification model predicts that documents that include the word "mediation" are likely to be relevant. However, documents that include the word "arbitration" would also be considered relevant by an expert, but the classification model would not include this data based on the original training set.

After constructing the second batch of documents in block 360, the method 250 returns to block 260 of FIG. 2.

Returning to FIG. 2, in block 260, the apparatus 600 obtains labels for unlabeled documents in the second batch. The second batch of documents are provided for review. The labels may be provided by the expert 614 that is reviewing the newly provided documents. The labels may be provided by an algorithm, from an industry standard, or by any suitable source. In an example, each document is presented to the expert 614 on a user interface of the display 610. The second batch of documents may be presented in a file, on a clickable list, or in any other suitable manner.

In an example, each document is presented to the expert 614 on a user interface of the display 610. The documents may be presented in a file, on a clickable list, or in any other suitable manner.

The label may be applied by the expert 614 by clicking a digital link or other interface object presented on the user interface presenting the documents or otherwise digitally signifying that a document is relevant or not. For example, the expert 614 clicks a button that reads "relevant" or a button that reads "not relevant." The apparatus 600 receives an input of the label for each document and logs the received label for each document.

The apparatus 600 receives a report, list, or other indication of the documents that are relevant. For example, when the expert 614 clicks an interface object that indicates if a document is relevant or not, the apparatus 600 logs the indication and the characteristics of the document that was labeled.

In block 270, the apparatus 600 adds the labeled instances to current training data to obtain extended training data. The newly labeled documents are included in the training documents to further train the classification model. Because the newly labeled documents included additional diversity in the document selection, the classification model will have a broader base of data from which to construct the classification model. If additional relevant documents are included that would not have been included without the added diversity, then the diversity has improved the classification model by allowing additional relevant documents to be included in future document sets.

In an example, the classification model predicts that documents that include the word "mediation" are likely to be relevant. However, one of the 20 diverse documents includes the word "arbitration" and is labeled by an expert as relevant. The classification model receives this input and includes the input of this new relevant key word in the updated classification model. Future documents with the word "arbitration" are now more likely to be considered relevant according to the classification model.

In block 280, the apparatus 600 constructs the updated classification model based on the extended training data. The updated classification model is used to assess new documents for sorting as described herein. Using the updated classification model, the apparatus 600 applies any suitable method of document batch selection to provide new documents for review. The method 200 then returns to block 250 to continue providing documents to a reviewer according the updated classification model and to continue monitoring to determine when to trigger adding diverse documents and further updating the classification model.

In examples, the method 200 may be repeated to continue to refine the classification model and to improve the document selection. That is, the found rate may be monitored for subsequent documents, additional diversity may be employed, and the classification may be further refined based on the subsequently labeled documents. The method 200 may continue until stopped by the apparatus 600 or a user 614, or until the documents are all reviewed.

Other Examples

FIG. 4 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random-access memory ("RAM"), static random-access memory ("SRAM"), dynamic random-access memory ("DRAM"), and synchronous dynamic random-access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation to encompass such alternate examples.

Although specific examples have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

The invention claimed is:

1. A computer program product, comprising:

a non-transitory computer-readable storage device having computer-executable program instructions embodied thereon that, when executed by a computer, cause the computer to implement diversity sampling for technology-assisted review ("TAR") of documents by providing additional documents not selected based on initial criteria for a classification model to select documents, the computer-executable instructions comprising:

constructing a classification model based on training data comprising documents identified as likely to be relevant, the constructed classification model being configured to identify documents that are potentially relevant based on initial criteria for the constructed classification model to select documents;

executing the constructed classification model to identify documents based on the initial criteria for the classification model to select documents;

providing at least a portion of the documents identified by the constructed classification model for review by a reviewer;

receiving an input of a label from the reviewer indicating at least one of relevant or not relevant for each of the documents identified by the constructed classification model provided for review;

determining a found rate of the documents identified by the constructed classification model provided for review that were labeled as relevant, the found rate based on a number of documents labeled as relevant and a total number of documents provided for review;

determining that the found rate meets a defined threshold;

determining, in response to the found rate meeting the defined threshold, to provide diverse documents for review with the identified documents that are provided for review, the diverse documents comprising documents that do not meet the initial criteria for selection by the constructed classification model;

executing the constructed classification model to identify the diverse documents that do not meet the initial criteria for selection by the constructed classification model; and providing the diverse documents for review with at least another portion of the identified documents that are provided for review.

2. The computer program product of claim 1, wherein determining that the found rate meets the defined threshold comprises determining that the found rate has dropped below a configured amount.

3. The computer program product of claim 1, wherein determining that the found rate meets the defined threshold comprises determining that the found rate has dropped at a rate greater than a configured amount.

4. The computer program product of claim 1, wherein determining that the found rate meets the defined threshold comprises determining that the found rate has not increased by a configured amount in a configured amount of time.

5. The computer program product of claim 1, the computer-executable program instructions further comprising:

receiving an input of a label from the reviewer for each of the diverse documents provided for review; and updating the initial criteria used by the established classification model to select documents based on the label received for each of the diverse documents.

6. The computer program product of claim 5, wherein updating the initial criteria used by the classification model comprises creating training data based on the label received for each of the diverse documents and labels for other documents, and updating the classification model based on the training data.

7. The computer program product of claim 1, further comprising determining an amount of the diverse documents to provide for review with the at least another portion of the identified documents, wherein a larger amount of diverse documents is provided for review based on the found rate having a larger deviation from the defined threshold.

8. The computer program product of claim 1, further comprising determining an amount of the diverse documents to provide for review with the at least another portion of the identified documents, wherein an amount of the diverse documents provided for review is based on a magnitude of change in the found rate.

9. The computer program product of claim 1, wherein the classification model is generated via a machine-learning function.

10. The computer program product of claim 1, wherein the diverse documents provided for review are selected based on a diversity sampler process or a biased probabilistic sampler process.

11. The computer program product of claim 1, wherein the documents are associated with a document review in a legal proceeding.

12. The computer program product of claim 1, wherein the classification model is a hyperplane.

13. The computer program product of claim 12, wherein the hyperplane is created by a support vector machine.

14. A computer-implemented method to implement diversity sampling for technology-assisted review ("TAR") of documents, comprising:

constructing, using one or more computing devices, a classification model based on training data comprising documents identified as likely to be relevant, the constructed classification model being configured to identify documents that are potentially relevant based on initial criteria for the constructed classification model to select documents;

executing, using one or more computing devices, the constructed classification model to identify documents based on the initial criteria for the classification model to select documents;

providing, using the one or more computing devices, at least a portion of the documents identified by the constructed classification model for review by a reviewer;

receiving, using the one or more computing devices, an input of a label from the reviewer indicating at least one of relevant or not relevant for each of the documents identified by the constructed classification model provided for review;

determining, using the one or more computing devices, a found rate of the documents identified by the constructed classification model provided for review that were labeled as relevant, the found rate based on a number of documents labeled as relevant and a total number of documents provided for review;

determining, using the one or more computing devices, that the found rate meets a defined threshold;

determining, using the one or more computing devices and in response to the found rate meeting the defined threshold, to provide diverse documents for review with the identified documents that are provided for review, the diverse documents comprising documents that do not meet the initial criteria for selection by the constructed classification model; and executing, using the one or more computing devices, the constructed classification model to identify the diverse documents that do not meet the initial criteria for selection by the constructed classification model; and providing, using the one or more computing devices, the diverse documents for review with at least another portion of the identified documents that are provided for review.

15. The computer-implemented method of claim 14, wherein determining that the found rate meets the defined threshold comprises determining that the found rate has dropped below a configured amount.

16. The computer-implemented method of claim 14, wherein determining that the found rate meets the defined threshold comprises determining that the found rate has dropped at a rate greater than a configured amount.

17. The computer-implemented method of claim 14, further comprising:

receiving an input of a label from the reviewer for each of the diverse documents provided for review; and updating the initial criteria used by the established classification model to select documents based on the label received for each of the diverse documents.

18. The computer-implemented method of claim 14, wherein determining that the found rate meets the defined threshold comprises determining that the found rate has not increased by a configured amount in a configured amount of time.

19. The computer-implemented method of claim 14, further comprising determining, based on a magnitude of the found rate, an amount of the diverse documents to provide for review with the at least another portion of the identified documents.

20. A system to implement diversity sampling for technology-assisted review ("TAR") of documents, comprising:

a storage resource; and a processor communicatively coupled to the storage resource, wherein the processor executes application code instructions that are stored in the storage resource to cause the processor to:

construct a classification model based on training data comprising documents identified as likely to be relevant, the constructed classification model being configured to identify documents that are potentially relevant based on initial criteria for the constructed classification model to select documents;

execute the constructed classification model to identify documents based on the initial criteria for the classification model to select documents;

provide at least a portion of the documents identified by the constructed classification model for review by a reviewer;

receive an input of a label from the reviewer indicating at least one of relevant or not relevant for each of the documents identified by the constructed classification model provided for review;

determine a found rate of the documents identified by the constructed classification model provided for review that were labeled as relevant, the found rate based on a number of documents labeled as relevant and a total number of documents provided for review;

determine that the found rate meets a defined threshold;

determine, in response to the found rate meeting the defined threshold, to provide diverse documents for review with the identified documents that are provided for review, the diverse documents comprising documents that do not meet the initial criteria for selection by the classification model;

execute the constructed classification model to identify the diverse documents that do not meet the initial criteria for selection by the constructed classification model; and provide the diverse documents for review with at least another portion of the identified documents that are provided for review.

* * * * *

UNITED STATES PATENT AND TRADEMARK OFFICE

CERTIFICATE OF CORRECTION

PATENT NO. : 11,790,047 B2
APPLICATION NO. : 17/004953
DATED : October 17, 2023
INVENTOR(S) : Jeffrey A. Johnson, Md Ahsan Habib and Chandler L. Burgess It is certified that error appears in the above-identified patent and that said Letters Patent is hereby corrected as shown below:

In the Claims

Column 19
Line 4, "executing, using one" should read -- executing, using the one --
Line 31, "model; and" should read -- model; --

Signed and Sealed this
Twenty-first Day of November, 2023

Katherine Kelly Vidal

Katherine Kelly Vidal
*Director of the United States Patent and Trademark Office*